United States Patent
Hagiwara

(10) Patent No.: US 8,681,478 B2
(45) Date of Patent: Mar. 25, 2014

(54) ELECTROCHEMICAL DEVICE

(75) Inventor: Naoto Hagiwara, Tokyo (JP)

(73) Assignee: Taiyo Yuden Co., Ltd., Tokyo (JP)

( * ) Notice: Subject to any disclaimer, the term of this patent is extended or adjusted under 35 U.S.C. 154(b) by 0 days.

(21) Appl. No.: 13/607,064

(22) Filed: Sep. 7, 2012

(65) Prior Publication Data
US 2013/0148264 A1 Jun. 13, 2013

(30) Foreign Application Priority Data
Sep. 9, 2011 (JP) .................. 2011-196858

(51) Int. Cl.
*H01G 2/10* (2006.01)

(52) U.S. Cl.
USPC .......... 361/535; 361/502; 361/503; 361/512; 361/517; 361/528

(58) Field of Classification Search
USPC ......... 361/502, 503–504, 509–512, 516–519, 361/523–525, 528–529, 534–535
See application file for complete search history.

(56) References Cited

U.S. PATENT DOCUMENTS

| | | | |
|---|---|---|---|
| 5,953,204 A * | 9/1999 | Suhara et al. | 361/502 |
| 6,327,137 B1 * | 12/2001 | Yamamoto et al. | 361/517 |
| 6,844,105 B1 * | 1/2005 | Hanafusa et al. | 429/62 |
| 7,206,190 B2 * | 4/2007 | Murakami et al. | 361/502 |
| 7,277,738 B2 * | 10/2007 | Reece et al. | 455/575.7 |
| 7,411,777 B2 * | 8/2008 | Chiba | 361/502 |
| 7,986,510 B1 * | 7/2011 | Smith et al. | 361/502 |
| 8,009,409 B2 * | 8/2011 | Reynolds | 361/502 |
| 8,455,136 B2 * | 6/2013 | Ishida et al. | 429/178 |

FOREIGN PATENT DOCUMENTS

JP  2010-186691 A  8/2010

* cited by examiner

*Primary Examiner* — Nguyen T Ha
(74) *Attorney, Agent, or Firm* — Pillsbury Winthrop Shaw Pittman, LLP

(57) ABSTRACT

A container 11 of a surface mounting electrochemical device according to an embodiment of the invention comprises a first metal component 11a having a recess 11a1, a second metal component 11b directly welded to the first metal component 11a to close the opening of the recess 11a1. A first electrode 16a of an electric storage element 16 is electrically insulated from the container 11, and a second electrode 16b electrically conducts thereto. A first terminal 14 is electrically insulated from the container 11 and electrically conducts to the first electrode 16a of the electric storage element 16 via a relaying element 13. A second terminal 15 electrically conducts to the container 11 and the second electrode 16b of the electric storage element 16 via the container 11.

11 Claims, 6 Drawing Sheets

ELECTROCHEMICAL DEVICE

CROSS-REFERENCE TO RELATED APPLICATIONS

This application is based on and claims the benefit of priority from Japanese Patent Application Serial No. 2011-196858 (filed on Sep. 9, 2011), the contents of which are hereby incorporated by reference in their entirety.

FIELD OF INVENTION

The invention relates to an electrochemical device having a structure wherein a container encloses a rechargeable electric storage element and electrolyte.

BACKGROUND

Conventionally, this type of electrochemical devices are generally divided into surface mounting type (square type), coin type, thin type, and cylinder type. A surface mounting electrochemical device is provided, on its mounting surface, with a first terminal and a second terminal having opposite polarities. The surface mounting electrochemical device is surface mountable to a circuit board, similar to surface mounting components such as chip capacitors and chip inductors; therefore, this device is frequently used and is in increased demand.

As disclosed in Japanese Patent Application Publication No. 2010-186691 (Patent Literature 1), a conventional surface mounting electrochemical device comprises a container, a rechargeable electric storage element and electrolyte enclosed in the container, and a first terminal and a second terminal having opposite polarities disposed on the bottom surface of the container, the bottom surface providing a mounting surface.

The container comprises an insulating component having a recess and a metal component to open the recess of the insulating component. The insulating component is formed of ceramics, and the metal component is formed of kovar (a Fe—Ni—Co alloy). A welding ring formed of kovar is disposed on the insulating component such that it encompasses the opening of the recess, so as to connect the metal component with the insulating component. The metal component closes the opening of the recess of the insulating component by being welt to the welding ring. Further, the insulating component is provided with wiring for the first terminal and wiring for the second terminal so as to electrically couple the first terminal to a first electrode of the electric storage element and the second terminal to a second electrode thereof.

Thus, a conventional electrochemical device requires a welding ring, wiring for a first terminal, and wiring for a second terminal on an insulating component constituting a container. Therefore, production cost of the container, particularly the insulating component, is high. It is difficult to lower the production cost or selling price of the electrochemical device.

It has been an important technological issue for manufacturers to produce an electrochemical device having a structure that lowers the selling price.

PATENT LITERATURE

Patent Literature 1: Japanese Patent Application Publication No. 2010-186691

The invention provides a surface mounting electrochemical device having a structure that lowers a selling price.

An electrochemical device according to an embodiment of the invention is a surface mounting electrochemical device comprising: a container including a first metal component having a recess and a second metal component welded to the first metal component to close an opening of the recess of the first metal component; a rechargeable electric storage element and electrolyte enclosed in the container; and a first terminal and a second terminal having opposite polarities disposed on a bottom surface for serving as a mounting surface, wherein the electric storage element has a first electrode electrically insulated from the container, and a second electrode electrically conducting with the container, and wherein the first terminal is electrically insulated from the container and electrically conducts with the first electrode of the electric storage element via a relaying element disposed on the container so as to be electrically insulated from the container, and wherein the second terminal electrically conducts with the container and electrically conducts with the second electrode of the electric storage element via the container.

According to an embodiment of the invention, the container comprises a first metal component having a recess, a second metal component welded directly to the first metal component to close the opening of the recess; therefore, a welding ring is not required to be formed on the container as in a conventional art. Also, the second terminal electrically conducts with the container and electrically conducts with the second electrode of the electric storage element via the container, and therefore, does not require wiring for the second terminal on the container as required in the conventional art. In other words, the second terminal electrically conducts with the second electrode via the container instead of wiring. Further, a relaying element which electrically couples the first terminal to the first electrode of the electric storage element has a remarkably simple structure, thereby simplifying the structure of the electrochemical device compared to that of the conventional art, which greatly contributes to lower manufacturing costs or selling prices.

Features and natures, and operation method and functions of combination of related configuration elements and components of the invention are further clarified by examining detailed explanations, claims, and drawings attached hereto.

BRIEF DESCRIPTION OF THE DRAWINGS

In the specification, related portions in various drawings are indicated by similar reference numbers. The attached drawings show examples and are for explanatory purposes, and are not intended to be used to define certain matters of the invention.

DETAILED DESCRIPTION

Figure 1:
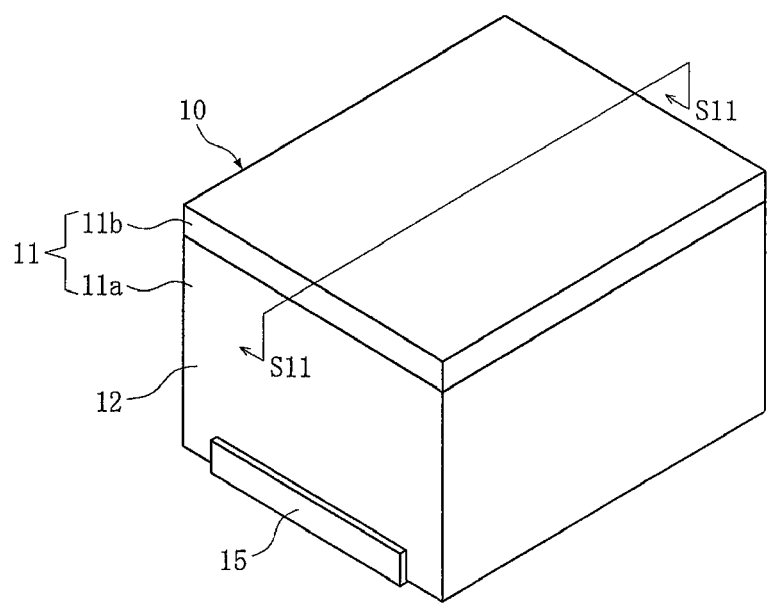
FIG. 1 shows a perspective view of an electrochemical device according to an embodiment of the invention.
Figure 2:
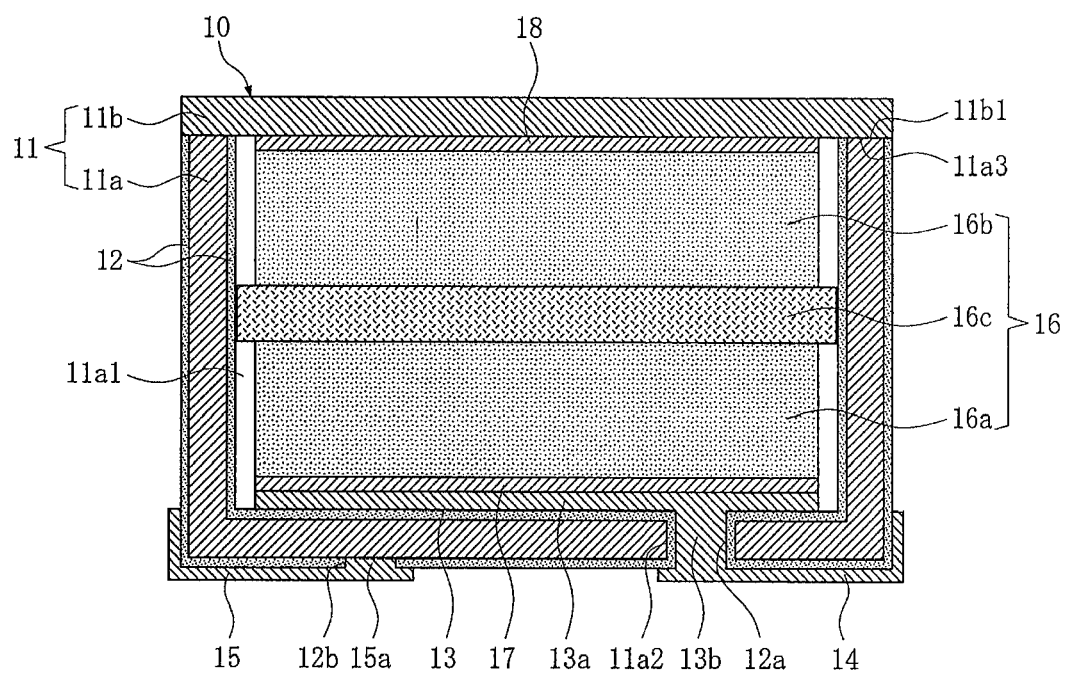
FIG. 2 shows an expanded sectional view of the electrochemical device of FIG. 1 viewed along a S11-S11 line.

FIGS. 1 and 2 show an electrochemical device according to an embodiment of the invention. An electrochemical device 10 shown in FIGS. 1 and 2 comprises a roughly rectangular container 11, electric storage elements 16 and electrolyte (not shown) enclosed in the container 11, and a first terminal 14 and a second terminal 15 having opposite polarities disposed on a bottom surface of the container 11. The container 11 is to be mounted such that its bottom surface faces a printing circuit board.

The container 11 comprises a roughly rectangular first metal component 11a having a recess 11a1 which has a roughly rectangular cross-sectional outline and the top of which is open, and a tabular second metal component 11b welded directly with the first metal component 11a so as to close the opening of the recess 11a1 in the first metal component 11a. The outline of the bottom surface of the second metal component 11b is roughly rectangular, and roughly agrees with the outline of the top surface of the first metal component 11a.

The first metal component 11a comprises a stainless steel such as SUS304 or SUS 316, or metal materials such as aluminum, nickel, or titanium. A through hole 11a2 is formed at a bottom plate, and its cross section outline is roughly round. A desirable thickness of the first metal component 11a is in a range of 100-150 μm, and a desirable inner diameter of the through hole 11a2 is in a range of 100-300 μm.

A predefined area of a surface of the first metal component 11a, specifically, four outer lateral surfaces, a bottom surface excluding a first terminal connection 12a and a second terminal connection 12b, an inner circumferential surface of the through hole 11a2, four inner lateral surfaces, an inner bottom surface excluding the first terminal connection 12a, is covered with an insulating layer 12. The insulating layer 12 comprises, for example, an insulating material such as alumina, titanium ia, silica, epoxy resin, or fluororesin. A desirable thickness of the insulating layer 12 is in a range of 10-50 μm.

The first terminal connection 12a refers to a through hole defined by the insulating layer 12 covering the inner circumferential surface of the through hole 11a2. The second terminal connection 12b refers to a hole formed in the insulating layer 12 covering the bottom surface of the first metal component 11a.

A relaying element 13 that cause a first electrode 16a of an electric storage element 16 to electrically conduct with a first terminal 14 is formed on the first metal component 11a. The relaying element 13 has a film-like portion 13a formed on a top surface of the insulating layer 12 covering an inner bottom surface of the recess 11a1 of the first metal component, and a column 13b filled in the first terminal connection 12a. The outline of the top surface of the film-like portion 13a roughly agrees with the outline of the bottom surface of a first electrode 16a of the electric storage element 16. The film-like portion 13a comprises a metal material such as copper, nickel, titanium, gold, or palladium. A desirable thickness of the film-like portion 13a is in a range of 10-100 μm. The film-like portion 13a has either of single layer structure or multilayer structure. The outermost layer of the film-like portion 13a desirably forms an aluminum film or an alloy film containing aluminum for better resistance against corrosion by an electrolyte. The column 13b comprises a metal material such as copper, nickel, titanium, gold, or palladium. An outer diameter of the column 13b is equal to an inner diameter of the through hole 11a2 minus doubled thickness of the insulating layer 12.

The second metal component 11b comprises a stainless steel such as SUS304 or SUS316, or a metal material such as aluminum, nickel, or titanium. The second metal component 11b desirably comprises the same metal material as the first metal component 11a. A desirable thickness of the second metal component 11b is in a range of 100-150 μm.

An outer periphery of the bottom surface 11b1 of the second metal component 11b is water-tightly and air-tightly jointed with an outer periphery of the top surface 11a3 of the first metal component 11b by a welding method such as laser welding, seam welding, or others.

A first terminal 14 is formed, in the form of a film, on a bottom surface of the insulating layer 12 covering a bottom surface of the first metal component 11a. The first terminal 14 is formed such that its bottom surface outline is roughly rectangular. A top surface of the first terminal 14 is electrically coupled to the lower surface of the column 13b of the relaying element 13. The first terminal 14 may be formed such that its ends are on the lateral surface of the first metal component 11a as shown in the figure. The shown shape of the first terminal 14 is only one example and is not limitative.

The first terminal 14 comprises a metal material such as copper, nickel, titanium, gold, or palladium. A desirable thickness thereof is in a range of 10-100 μm. The first terminal 14 has either of single layer structure or multilayer structure. The outermost layer of the first terminal 14 desirably forms a tin film or an alloy film containing tin for improved soldering.

A second terminal 15 is formed, in the form of a film, on a bottom surface of the insulating layer 12 covering a bottom surface of the first metal component 11a. The second terminal 15 is formed such that its bottom surface outline is roughly rectangular. The second terminal 15 is electrically coupled to the bottom surface of the first metal component 11a through a projection 15a of the second terminal 15 disposed in the second terminal connection 12b. The second terminal 15 may be formed such that its ends are on the lateral surface of the first metal component 11a as shown in the figure. The shown shape of the second terminal 15 is only one example and is limitative.

The second terminal 15 comprises metal materials such as copper, nickel, titanium, gold, or palladium. A desirable thickness thereof is in a range of 10-100 μm. The second terminal 15 has either of a single layer structure or multilayer structure. The outermost layer of the second terminal 15 desirably forms a tin film or an alloy film containing tin for improved soldering.

The electric storage element 16 comprises a pair of electrodes 16a and 16b having opposite polarities, and a separator 16c disposed between the pair of electrodes 16a and 16b. The electrodes 16a and 16b are formed such that bottom surface outlines thereof are roughly rectangular. The separator 16c is formed such that outline thereof is slightly larger than those of the electrodes 16a and 16b. Thicknesses of the electrodes 16a and 16b are determined based on an interval between the inner bottom surface of the recess 11a1 of the first metal component 11a and the bottom surface of the second metal component 11b. The separator comprises an ion permeable porous sheet such as a glass fiber sheet, cellulose fiber sheet, or plastic fiber sheet. A desirable thickness thereof is in a range of 50-200 μm.

A bottom surface of a first electrode 16a (a positive electrode here) of the electric storage element 16 is adhered to a top surface of the film-like portion 13a of the relaying element 13 via a conductive adhesive film 17. Thus, the first electrode 16a and the relaying element 13 are electrically coupled. A top surface of a second electrode 16b (a negative electrode here) is adhered to a bottom surface of the second metal component 11b via a conductive adhesive film 18. Thus, the second electrode 16b and the second metal component 11b are electrically coupled.

The conductive adhesive films 17 and 18 comprise a hardened conductive adhesive agent. The conductive adhesive agent is, for example, a thermosetting adhesive containing conductive particles such as a phenolic adhesive containing carbon particles (carbon black), graphite particles, or other substances. Each of the desirable thicknesses of the conductive adhesive films 17 and 18 is in a range of 10-100 μm.

If an electrochemical device 10 is, for example, a PAS capacitor or activated carbon capacitor, the electrodes 16a and 16b comprise a same material. Materials of the electrodes 16a and 16b may include carbon-based material such as activated carbon, polyacene Semiconductor (PAS), or other conductive polymers. In this case, the solvent in an electrolyte may be, for example, propylene carbonate, propylene carbonate and sulfolane (a mixed solvent), propylene carbonate and ethyl isopropyl sulfone (a mixed solvent), propylene carbonate and sulfolane and methyl propionate (a mixed solvent), or sulfolane and ethyl methyl sulfone (a mixed solvent). The solute in the electrolyte may be 5-Azoniaspiro[4.4] nonane·BF4, TEMA·BF4, TEA·BF4, 1-ethyl-2,3-Dimethylimidazolium·BF4, or 1-ethyl-3-Dimethylimidazolium·BF4.

If the electrochemical device 10 is, for example, a lithium ion capacitor, the first electrode 16a comprises, for example, activated carbon, and the second electrode 16b comprises non-graphitization carbon (hard carbon), graphite, or other materials that is capable of occlusion and desorption of lithium ion. In this case, the solvent in an electrolyte may be propylene carbonate, ethylene carbonate, or sulfolane. The solute in the electrolyte may be $LiPF_6$, $LiBF_4$, $LiCIO_4$, or other lithium salts.

A desirable method of fabricating the electrochemical device 10 is explained hereinafter. The first step is to fabricate a first metal component 11a and a second metal component 11b that constitute a container 11, and electrodes 16a and 16b and separator 16c that constitute an electric storage element 16.

The first metal component 11a is fabricated, for example, by either of two methods to be explained hereinafter. In the first method, a through hole corresponding to a through hole 11a2 is formed in a prepared metal plate, and then the metal plate is cut to a predefined size. The through hole is formed by punching, laser processing, or other techniques. Next, an insulating layer is formed on an entire surface (including an inner circumferential surface of the through hole 11a2) of the cut metal plate. Then, a part of thus formed insulating layer (corresponding to outer periphery of a top surface 11a3 and a second terminal connection 12b) is removed. The insulating layer is formed by a film forming method such as anodic oxidation, CVD, thermal spraying, or electrode position. To remove the part of the insulating layer, chemical etching, blast processing or other technique is used. In another embodiment, the cut metal plate is previously masked and an insulating layer is formed thereon, and then the masking is removed. Next, the metal plate with the insulating layer formed thereon is provided with a metal film corresponding to a film-like portion 13a of a relaying element 13 and a metal film corresponding to a first terminal 14 and a second terminal 15. Then, a metal is filled into a through hole corresponding to a first terminal connection 12a. The filled metal forms a metal portion corresponding to a column 13b of the relaying element 13. Also, a metal is filled into a hole corresponding to the second terminal connection 12b. The filled metal forms a metal portion corresponding to a projection 15a of a second terminal 15. The film-like portion 13a, the first terminal 14, and the second terminal 15 are formed by application and baking of a metal paste, vapor deposition, plating, or other techniques. Forming the metal portion corresponding to the column 13b may be done simultaneously with forming the metal film corresponding to the film-like portion 13a or the first terminal 14. Also, forming the metal portion corresponding to the projection 15a may be done simultaneously with forming the metal film corresponding to the second terminal 15. The metal plate thus provided with the metal films and the metal portions is shaped into a rectangle corresponding to the first metal component 11a by press working.

In the second method, a through hole corresponding to a through hole 11a2 is formed in a prepared metal plate, and then the metal plate is cut to a predefined size. The through hole is formed by punching, laser processing, or other techniques. Next, the cut metal plate is shaped into a rectangle corresponding to the first metal component 11a by press working. Next, the component thus formed is provided with an insulating layer and then metal films and metal portions by the same process as employed in the first method.

The second metal component 11b is obtained by cutting a prepared metal plate to a predefined size.

The electrodes 16a and 16b are fabricated as follows. First, a mixture, is prepared which at least includes a main material for the electrodes 16a and 16b and a binder. Next, the mixture is rolled. Next, the rolled mixture is cut to a predefined size, thereby producing the electrodes 16a and 16b. A separator 16c is fabricated by cutting a sheet for separator to a predefined size.

The electrochemical device 10 is fabricated by assembling the above first metal component 11a, second metal component 11b, electrodes 16a and 16b, and separator 16c, as described below.

The electrochemical device 10 is assembled as follows. First, the first metal component 11a is placed such that the opening of a recess 11a1 thereof faces upward. Next, a conductive adhesive agent is applied on the top surface of the film-like portion 13a of the relaying element 13, and then a bottom surface of a first electrode 16a is pressed against the conductive adhesive agent for tight adhesion. Next, the conductive adhesive agent and the first electrode 16a are heated to cure the conductive adhesive agent and dry the first electrode 16a. Then, an electrolyte is injected into the first electrode 16a. Then, the separator 16c is placed on the top surface of the first electrode 16a, and then an electrolyte is injected into the separator 16c as necessary.

Apart from this, a conductive adhesive agent is applied on a top surface of a second metal component 11b, and then a bottom surface of a second electrode 16b is pressed against the conductive adhesive agent for tight adhesion. Next, the conductive adhesive agent and the second electrode 16b are heated to cure the conductive adhesive agent and dry the second electrode 16b. Next, an electrolyte is injected into the second electrode 16b.

Next, the integrated second electrode 16b and second metal component 11b is placed on the integrated first metal component 11a and first electrode 16a such that the bottom surface of the second electrode 16b faces the top surface of the separator 16c, and an outer periphery of the bottom surface 11b1 of the second metal component 11b faces an outer periphery of the top surface 11a3 of the first metal component 11a. Then, the outer periphery of the top surface 11a3 of the first metal component 11a and the outer periphery of the bottom surface 11b1 of the second metal component 11b are welded together, with the second metal component 11b being pressed against the first metal component 11a.

An electrochemical device 10 fabricated as above has the following merits.

In the electrochemical device 10, the container comprises a first metal component 11a having a recess 11a1 and the second metal component 11b welded directly to the first metal component 11a so as to close the opening of the recess 11a1 of the first metal component 11a. Therefore, a ring for welding is not necessarily provided on the container 11 as in a conventional art. Also, the second terminal 15 is electrically coupled to the second electrode 16b of the electric storage element 16 via the container 11, and therefore, does not require wiring in the container 11 as required in the conventional art. Further, a relaying element 13 that electrically couples the first terminal 14 to the first electrode 16a of the electric storage element 16 has a remarkably simple structure. Thus, the electrochemical device 10 has a simplified structure compared to an electrochemical device in a conventional art. The simplified structure of the electrochemical device 10 contributes to lower manufacturing costs and selling prices.

The container 11 does not have a ring for welding as in a conventional art, thereby eliminating a cost for the ring for welding, work cost to braze the ring, and work cost for forming a protective plate layer. Thus, eliminating the ring for welding contributes to lower manufacturing cost of electrochemical device 10, thereby lowering the selling price thereof.

Figure 3:
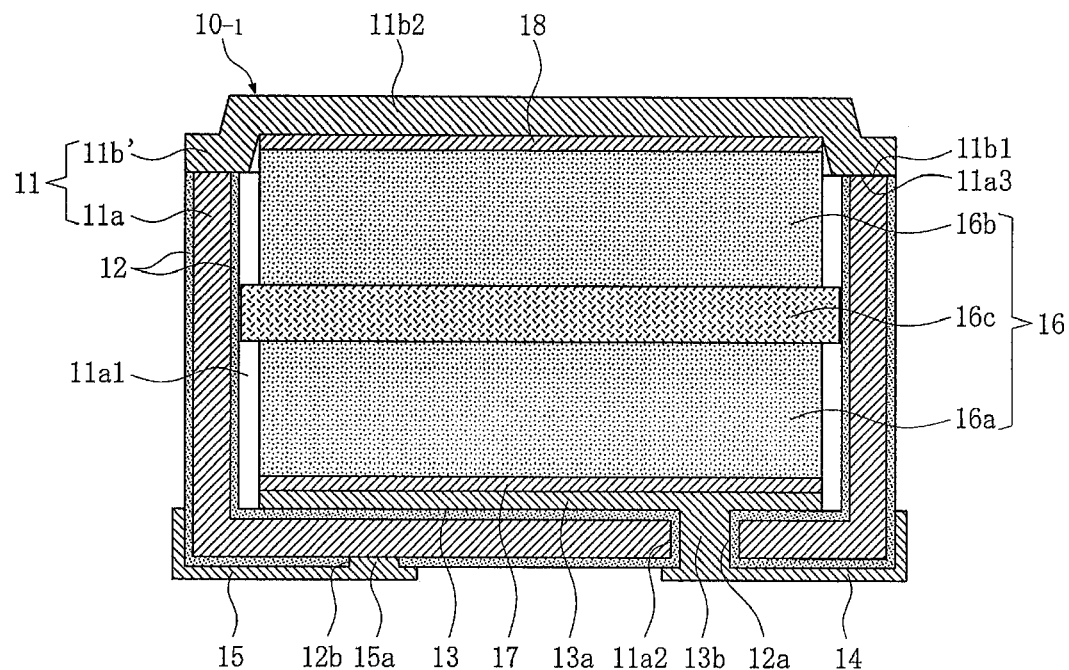
FIG. 3 shows an expanded sectional view of an electrochemical device according to another embodiment of the invention.

FIG. 3 shows an expanded sectional view of an electrochemical device according to another embodiment of the invention. An electrochemical device 10-1 as shown in FIG. 3 is configured similarly to the electrochemical device 10 except that a second metal component 11b' of a container 11 of the former has an upward protuberance 11b2 within the outer periphery of the bottom surface 11b1.

The thickness of the second metal component 11b' is roughly constant and desirably lies in a range of 100-150 μm. The bottom surface outline of the upward protuberance 11b2 roughly agrees with the top surface outline of a second electrode 16b. The top surface of the second electrode 16b is adhered to the bottom surface of the upward protuberance 11b2 via a conductive adhesive film 18. Thus, the second electrode 16b and the second metal component 11b' are electrically coupled. As shown in FIG. 3, a recess is formed in a portion of the bottom surface of the second metal component 11b' corresponding to the upward protuberance 11b2, and the second electrode 16b of the electric storage element 16 slightly penetrates the recess.

The second metal component 11b' is fabricated by deforming a metal plate by press working.

In the electrochemical device 10-1, the second metal component 11b' has the upward protuberance 11b2 that improves a mechanical strength of the second metal component 11b' compared to the second metal component 11b of the electrochemical device 10, thereby improving a mechanical strength of the container 11.

The second electrode 16b of the electric storage element 16 slightly penetrates the recess in a bottom surface of the second metal component 11b'. This arrangement enables a precise positioning of the second electrode 16b with respect to the second metal component 11b' and prevents the displacement of the second electrode 16b.

Figure 4:
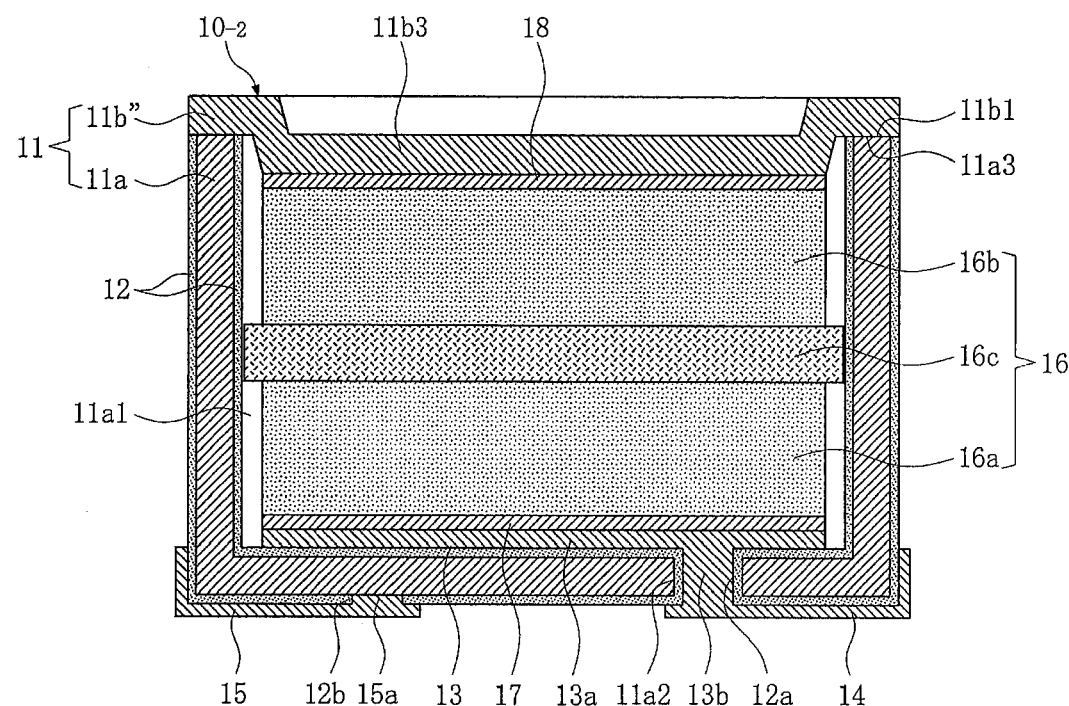
FIG. 4 shows an expanded sectional view of an electrochemical device according to another embodiment of the invention.

FIG. 4 shows a partial expanded sectional view of an electrochemical device according to another embodiment of the invention. An electrochemical device 10-2 as shown in FIG. 4 is configured similarly to the electrochemical device 10 except that a second metal component 11b'' of a container 11 of the former has a downward protuberance 11b3 within the outer periphery of the bottom surface 11b1.

The thickness of the second metal component 11b'' is roughly constant and desirably lies in a range of 100-150 μm. The bottom surface outline of the downward protuberance 11b3 roughly agrees with the top surface outline of a second electrode 16b. The top surface of a second electrode 16b is adhered to the bottom surface of the downward protuberance 11b3 via a conductive adhesive film 18. Thus, the second electrode 16b and the second metal component 11b'' are electrically coupled. As shown in FIG. 4, the downward protuberance 11b3 of the second metal component 11b'' penetrates the recess 11a1 of the first metal component 11a.

The second metal component 11b'' is fabricated by deforming a metal plate by press working.

In the electrochemical device 10-2, the second metal component 11b'' has the downward protuberance 11b3, thereby improving a mechanical strength of the second metal component 11b'' compared to the second metal component 11b of the electrochemical device 10, thereby improving a mechanical strength of the container 11.

The downward protuberance 11b3 of the second metal component 11b'' penetrates the recess 11a1 of the first metal component 11a, thereby enabling a precise positioning of the second metal component 11b'' with respect to the first metal component 11a.

Figure 5:
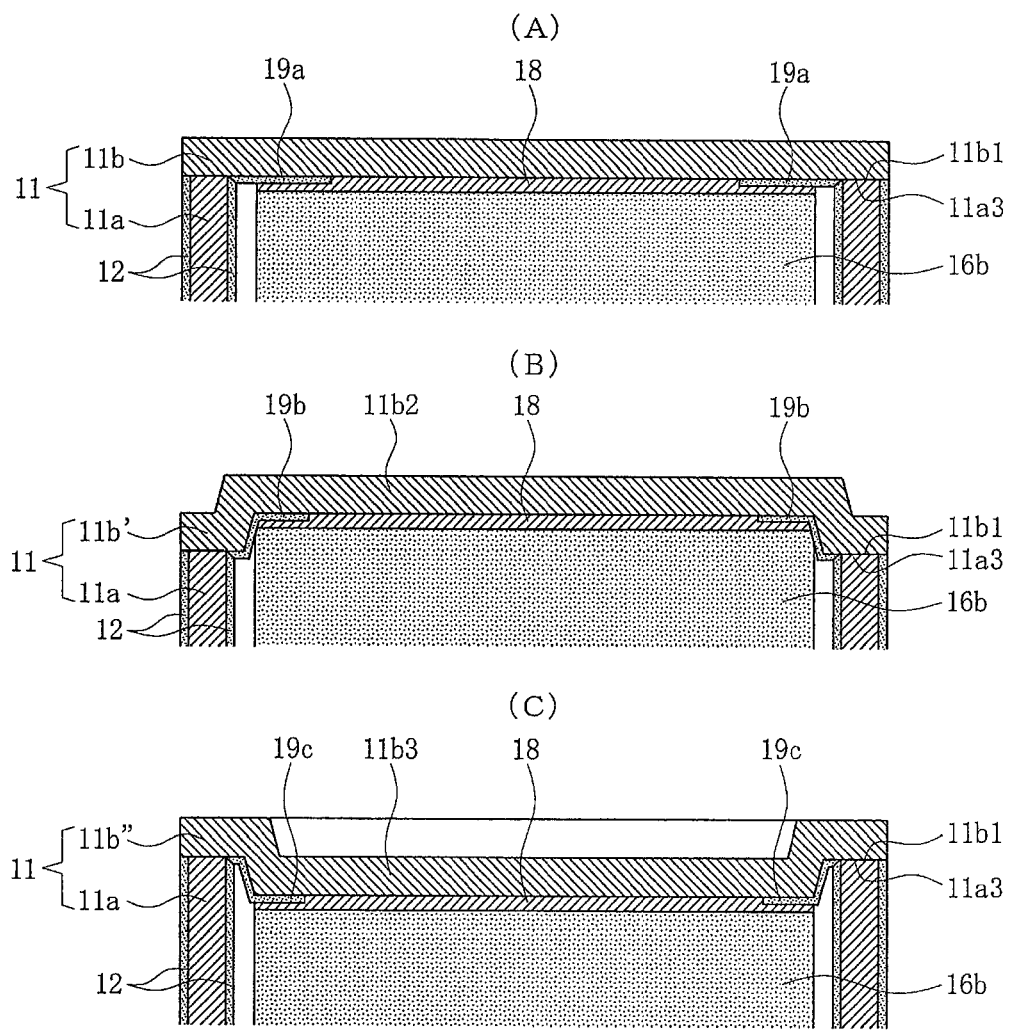
FIGS. 5(A), 5(B), and 5(C) show partial expanded sectional views of an electrochemical device according to another embodiment of the invention.

FIGS. 5(A), 5(B), and 5(C) show a partial expanded sectional view of an electrochemical device according to another embodiment of the invention. As shown in FIGS. 5(A)-5(C), in the embodiments, an insulating layer 19a (insulating layer 19b or insulting film 19c) is disposed on a second metal component 11b (a second metal component 11b' or second metal component 11b''). The insulating layer 19a (insulating layer 19b or insulating layer 19c) is disposed to cover a portion of the bottom surface of the second metal component 11b (second metal component 11b' or second metal component 11b'') that is exposed to an electrolyte and to continue with the upper edge of an inner side of an insulating layer 12.

According to the embodiments, the insulating layer 19a (insulating layer 19b or insulating layer 19c) prevents the second metal component 11b (second metal component 11b' or second metal component 11b'') from contacting directly with the electrolyte, thereby preventing the second metal component 11b (second metal component 11b' or second metal component 11b'') from being corroded.

Figure 6:
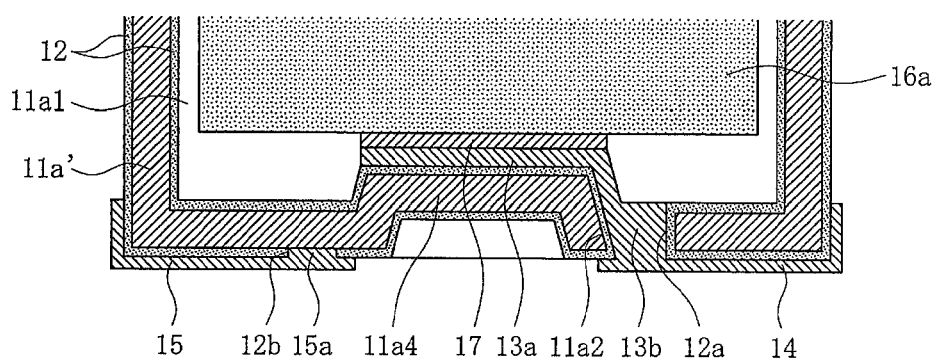
FIG. 6 shows a partial expanded sectional view of an electrochemical device according to another embodiment of the invention.

FIG. 6 shows a partial expanded sectional view of an electrochemical device according to another embodiment of the invention. As shown in FIG. 6, an upward protuberance 11a4 is disposed in a roughly center portion of a bottom plate of the first metal component 11a' of the container 11.

According to the embodiment, a mechanical strength of the first metal component 11a' is improved compared to the above-described flat first metal component 11a, thereby improving a mechanical strength of the container 11. The upward protuberance 11a4 may be fabricated in a various shapes. For example, by moving a first terminal connection 12a, a second terminal connection 12b, a column 13b, a first terminal 14, and a second terminal 15 to a side surface of the first metal component 11a', the upward protuberance 11a4 is configured such that an area of the top surface thereof is roughly equal to that of the bottom surface of the first electrode 16a.

Figure 7:
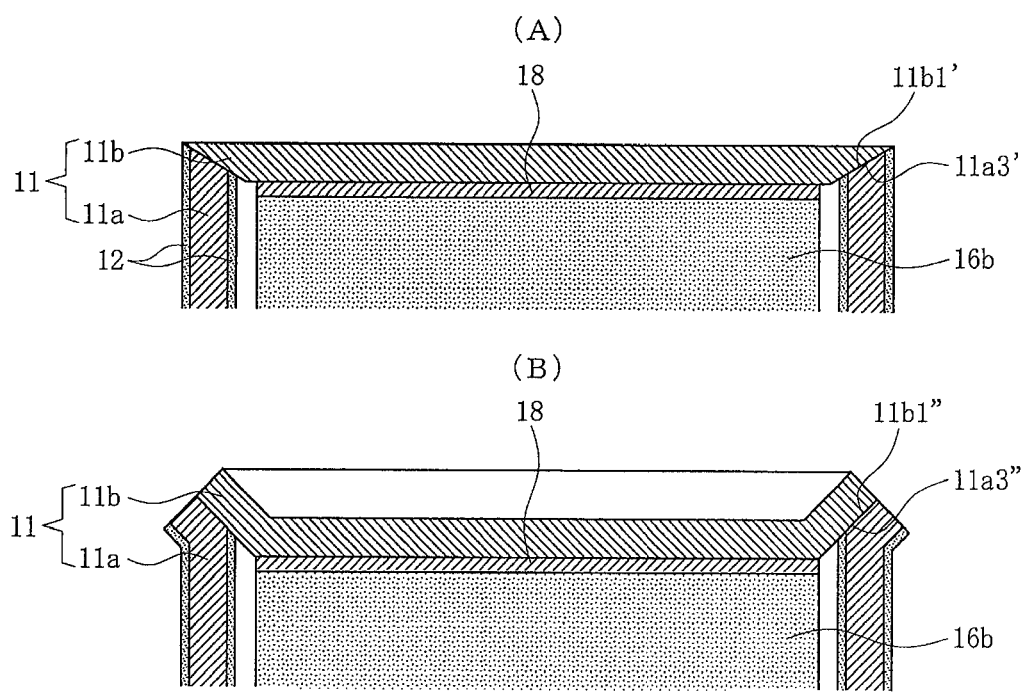
FIGS. 7(A) and 7(B) show partial expanded sectional views of an electrochemical device according to another embodiment of the invention.

FIG. 7(A) shows a partial expanded sectional view of an electrochemical device according to another embodiment of the invention. In the embodiment, as shown in FIG. 7, an outer periphery of the top surface 11a3' of a first metal component 11a is sloped at a predefined angle. Also, an outer periphery of the bottom surface 11b1' of a second metal component 11b is sloped at a roughly same angle as that of the outer periphery of the top surface 11a3'. FIG. 7(B) shows a partial expanded sectional view of an electrochemical device according to a further embodiment of the invention. In the embodiment, as shown in FIG. 7, an outer periphery of the top surface 11a3" of a first metal component 11a is configured as a brim sloped at a predefined angle. Also, an outer periphery of the bottom surface 11b1" of a second metal component 11b is configured as a brim sloped at a roughly same angle as that of the outer periphery of the top surface 11a3".

According to the embodiments, a contact area is increased between the outer periphery of the top surface 11a3'(or the outer periphery of the top surface 11a3") of the first metal component 11a and the outer periphery of the bottom surface 11b1' (or the outer periphery of the bottom surface 11b1") of the second metal component 11b. Also, a precise positioning between the first metal component 11a and the second metal component 11b is possible.

Figure 8:
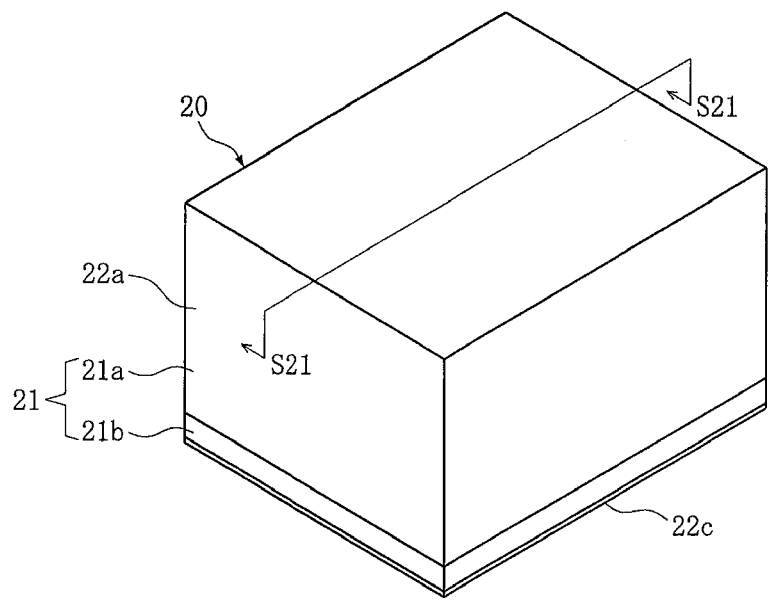
FIG. 8 shows a perspective view of an electrochemical device according to another embodiment of the invention.
Figure 9:
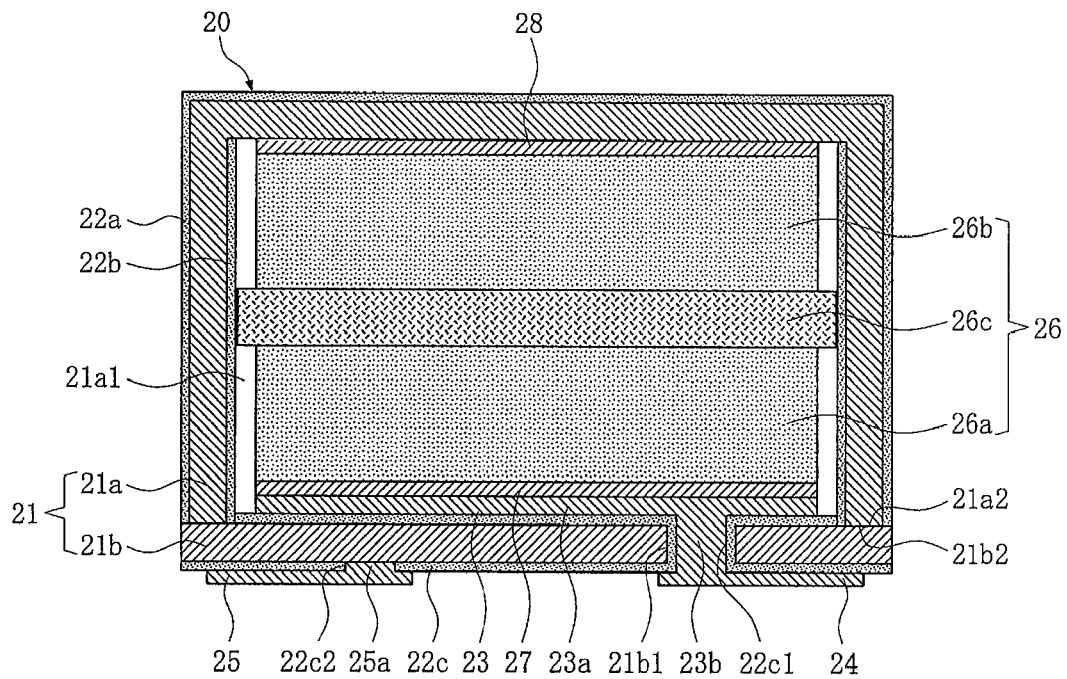
FIG. 9 shows an expanded sectional view of an electrochemical device of FIG. 8 viewed along a S21-S21 line.

FIGS. 8 and 9 show an electrochemical device according to another embodiment of the invention. The electrochemical device 20 shown in FIGS. 8 and 9 comprises a roughly rectangular container 21, electric storage elements 26 and electrolyte (not shown) enclosed in the container 21, and a first terminal 24 and a second terminal 25 having opposite polarities disposed on a bottom surface of the container 21. The container 21 is to be mounted such that its bottom surface faces a printing circuit board.

The container 21 comprises a roughly rectangular first metal component 21a having a recess 21a1 which has a roughly rectangular cross-sectional outline and the bottom of which is open, and a tabular second metal component 21b welded directly to the first metal component 21a so as to close the opening of the recess 21a1 of the first metal component 21a. A top surface outline of the second metal component 21b is roughly rectangular and roughly agrees with a bottom surface outline of the first metal component 21a.

The first metal component 21a comprises a stainless steel such as SUS304 or SUS316, or a metal material such as aluminum, nickel, or titanium. A desired thickness thereof is in a range of 100-150 µm.

Also, a predefined area of a surface of the first metal component 21a, specifically, four outer lateral surfaces, a top surface, and four inner lateral surfaces, is covered by the insulating layers 22a and 22b. The insulating layers 22a and 22b comprises, for example, an insulating material such as alumina, titania, silica, epoxy resin, or fluororesin. A desired thickness thereof is in a range of 10-50 µm.

On the other hand, the second metal component 21b comprises a stainless steel such as SUS304 or SUS 316, or a metal material such as aluminum, nickel, or titanium. The second metal component 21b desirably comprises the same metal material as the first metal component 21a. The second metal component 21b has a through hole 21b1 having a roughly circular cross-sectional outline. A desirable thickness of the second metal component 21b is in a range of 100-150 µm, and a desirable inner diameter of the through hole 21b1 is in a range of 100-300 µm.

A predefined area of a surface of the second metal component 21b, specifically, a bottom surface excluding a first terminal connection 22c1 and a second terminal connection 22c2, an inner circumferential surface of the through hole 21b1, and a top surface excluding an outer periphery of a top surface 21b2 and the first terminal connection 22c1, is covered with an insulating layer 22c comprising an insulating material such as alumina, titania, silica, epoxy resin, or fluororesin. A desirable thickness of an insulating layer 22c is in a range of 10-50 µm.

The first terminal connection 22c1 refers to a through hole defined by the insulating layer 22 covering the inner circumferential surface of the through hole 21b1. The second terminal connection 22c2 refers to a hole formed in the insulating layer 22c covering the bottom surface of the second metal component 21b.

A relaying element 23 that causes a first electrode 26a of an electric storage element 26 to electrically conduct with a first terminal 24 is formed in the second metal component 21b. The relaying element 23 has a film-like portion 23a formed on a top surface of the insulating layer 23c covering an upper surface of the second metal component 21b and a column 23b filled in the first terminal connection 22c1. A top surface outline of the film-like portion 23a roughly agrees with a bottom surface outline of a first electrode 26a of the electric storage element 26. The film-like portion 23a comprises a metal material such as copper, nickel, titanium, gold, or palladium. A desirable thickness thereof is in a range of 10-100 µm. The film-like portion 23a has either of single layer structure or multilayer structure. The outermost layer of the film-like portion 23a desirably forms an aluminum film or an alloy film containing aluminum for better resistance against corrosion by an electrolyte. The column 23b comprises a metal material such as copper, nickel, titanium, gold, or palladium.

An outer diameter of the column 23b is equal to an inner diameter of the through hole 21b1 minus a doubled thickness of the insulating layer 22c.

An outer periphery of the top surface 21b2 of the second metal component 21b is water-tightly and air-tightly jointed with an outer periphery of the bottom surface 21a2 by a welding method such as laser welding, seam welding, or others.

A first terminal 24 is formed, in the form of a film, on a bottom surface of the insulating layer 22c covering a bottom surface of the second metal component 21b. The first terminal 24 is formed such that its bottom surface outline is roughly rectangular. A top surface of the first terminal 24 is electrically coupled to the bottom surface of the column 23b of the relaying element 23.

The first terminal 24 comprises a metal material such as copper, nickel, titanium, gold, or palladium. A desirable thickness thereof is in a range of 10-100 µm. The first terminal 24 has either of single layer structure or multilayer structure. The outermost layer of the first terminal 24 desirably forms a tin film or an alloy film containing tin for improved soldering.

A second terminal 25 is formed, in the form of a film, on a bottom surface of the insulating layer 22c covering a bottom surface of the second metal component 21b. The second terminal 25 is formed such that its bottom surface outline is roughly rectangular. The second terminal 25 is electrically coupled to the bottom surface of the second metal component 21*b* via a projection 25*a* of the second terminal 25 extending into the second terminal connection 22*c*2.

The second terminal 25 comprises a metal material such as copper, nickel, titanium, gold, or palladium. A desirable thickness thereof is in a range of 10-100 μm. The second terminal 25 has either of single layer structure or multilayer structure. The outermost layer of the second terminal 25 desirably forms a tin film or an alloy film containing tin for improved soldering.

The electric storage element 26 comprises a pair of electrodes 26*a* and 26*b* having opposite polarities, and a separator 26*c* disposed between the pair of electrodes 26*a* and 26*b*. The electrodes 26*a* and 26*b* are formed such that outlines thereof are roughly rectangular. The separator 26*c* is formed such that outline thereof is slightly larger than those of the electrodes 26*a* and 26*b*. Thicknesses of the electrodes 26*a* and 26*b* are determined based on an interval between the inner bottom surface of the recess 21*a*1 of the first metal component 21*a* and the bottom surface of the second metal component 21*b*. The separator 26*c* comprises an ion permeable porous sheet such as a glass fiber sheet, cellulose fiber sheet, or plastic fiber sheet. A desirable thickness thereof is in a range of 50-200 μm.

A bottom surface of a first electrode 26*a* (a positive electrode here) of the electric storage element 26 is adhered to a top surface of the film-like portion 23*a* of the relaying element 23 via a conductive adhesive film 27. Thus, the first electrode 26*a* and the relaying element 23 are electrically coupled. A top surface of a second electrode 26*b* (a negative electrode here) is adhered to an inner bottom surface of the recess 21*a*1 of the first metal component 21*a* via a conductive adhesive film 28. Thus, the second electrode 26*b* and the first metal component 21*a* are electrically coupled.

The conductive adhesive films 27 and 28 comprises a hardened conductive adhesive agent.

The electrodes 26*a* and 26*b* may comprise a same material. In this case, the electrodes 26*a* and 26*b* comprises a carbon based material or a conductive polymer, as described above. The electrodes 26*a* and 26*b* may comprise different materials. In this case, the first electrode 26*a* comprises, for example, activated carbon and the second electrode 26*b* comprises, for example, non-graphitization carbon (hard carbon) or graphite. The electrolyte has been explained.

A desirable method of fabricating the electrochemical device 20 is explained hereinafter. The first step is to prepare a first metal component 21*a* and a second metal component 21*b* that constitute a container 21, and electrodes 26*a* and 26*b* and a separator 26*c* that constitute an electric storage element 26.

The first metal component 21*a* is fabricated, for example, by either of two methods to be explained hereinafter. In the first method, a prepared metal plate is cut to a predefined size. Next, an insulating layer is formed on an entire surface of the cut plate. Then, a part of the formed insulating layer (corresponding to an inner bottom surface of a recess 21*a*1 and an outer periphery of the bottom surface 21*a*2) is removed. Next, the metal plate on which the insulating layer is formed is shaped into a rectangle corresponding to the first metal component 21*a* by press working.

In the second method, a metal plate of a predefined size is shaped into a rectangle corresponding to the first metal component 21*a* by press working. An insulating layer is formed on thus shaped metal plate as described above.

The second metal component 21*b* is fabricated as follows. First, a through hole corresponding to a through hole 21*b*1 is formed in a prepared metal plate, and then the metal plate is cut to a predefined size. The through hole is formed by punching, laser processing, or other techniques. Next, an insulating layer is formed on an entire surface (including an inner circumferential surface of the through hole 21*b*1) of the cut plate, Next, a part of the formed insulating layer (corresponding to the outer periphery of the top surface 21*b*2 and a second terminal connection 22*c*2) is removed. In other embodiment, the cut metal plate is previously masked, and an insulating layer is formed thereon, and then the masking is removed. Next, the metal plate with the insulating layer formed thereon is provided with a metal film corresponding to a film-like portion 23*a* of a relaying element 23 and a metal film corresponding to a first terminal 24 and second terminal 25. A metal is filled into a through hole corresponding to the first terminal connection 22*c*1. The filled metal forms a metal portion corresponding to a column 23*b* of a relaying element 23. Also, a metal is filled into a hole corresponding to the second terminal connection 22*c*2. The filled metal forms a metal portion corresponding to a projection 15*a* of a second terminal 15. The film-like portion 23*a*, the first terminal 24, and the second terminal 25 are formed by application and baking of a metal paste, vapor deposition, plating, or other techniques.

Electrodes 26*a* and 26*b* are fabricated in the same manner as electrodes 16*a* and 16*b*.

The electrochemical device 20 is fabricated by assembling thus fabricated first metal component 21*a*, second metal component 21*b*, electrodes 26*a* and 26*b*, and separator 26*c*.

Specifically, the electrochemical device 20 is assembled as follows. First, the first metal component 21*a* is placed such that an opening of a recess 21*a*1 thereof faces upward, and a conductive adhesive agent is applied on the inner bottom surface of the recess 21*a*1. Next, a bottom surface of the second electrode 26*b* is pressed against the conductive adhesive agent for tight adhesion. Next, the conductive adhesive agent and the second electrode 26*b* are heated to cure the conductive adhesive agent and dry the second electrode 26*b*. Next, an electrolyte is injected into the second electrode 26*b*. Then, the separator 26*c* is placed on the top surface of the second electrode 26*b*, and then the electrolyte is injected into the separator 26*c* as necessary.

Apart from this, a conductive adhesive agent is applied on a top surface of a film-like portion 23*a* of a relaying element 23 in a second metal component 21*b*, and then a bottom surface of a first electrode 26*a* is pressed against the conductive adhesive agent for tight adhesion. Next, the fist electrode 26*a* and the conductive adhesive agent are heated to cure the conductive adhesive agent and dry the first electrode 26*a*. Next, the electrolyte is injected into the first electrode 26*a*.

Next, the integrated first electrode 26*a* and second metal component 21*b* is placed on the integrated second electrode 26*b* and first metal component 21*a* such that the top surface of the first electrode 26*a* faces the bottom surface of the separator 26*c*, and an outer periphery of the top surface 21*b*2 of the second metal component 21*b* faces the outer periphery of the bottom surface 21*a*2 of the first metal component 21*a*. Then, the outer periphery of the bottom surface 21*a*2 of the first metal component 21*a* and the outer periphery of the top surface 21*b*2 of the second metal component 21*b* are welded together, with the first metal component 21*a* being pressed against the second metal component 21*b*.

The electrochemical device 20 thus manufactured has a simplified structure compared to an electrochemical device in a conventional art. Thus simplified structure of the electrochemical device 20 contributes to lower manufacturing costs and selling prices. Also, eliminating the ring for welding from the electrochemical device 20 contributes to lower manufacturing cost of the electrochemical device 20, thereby lowering the selling price thereof.

Figure 10:
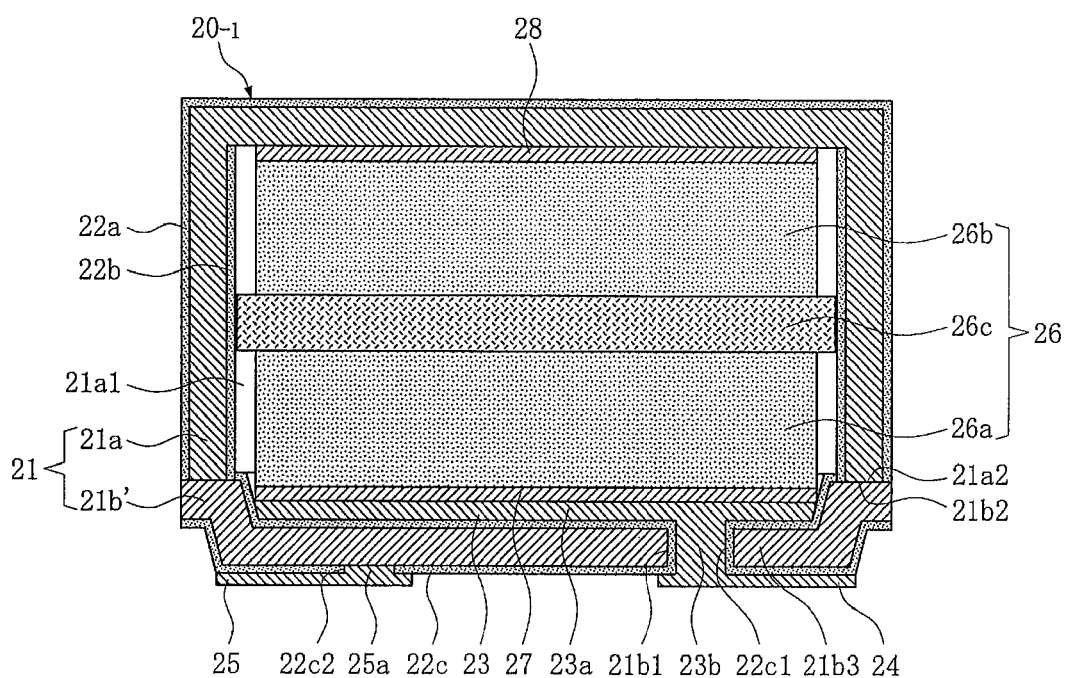
FIG. 10 shows an expanded sectional view of an electrochemical device according to another embodiment of the invention.

FIG. 10 shows a partial expanded sectional view of an electrochemical device according to another embodiment of the invention. The electrochemical device 20-1 as shown in FIG. 10 is configured similarly to the electrochemical device 20 except that a second metal component 21b' of a container 21 of the former has a downward protuberance 21b3 within the outer periphery of the top surface 21b2.

The thickness of the second metal component 21b' is roughly constant and desirably lies in a range of 100-150 µm. A top surface of the downward protuberance 21b3 is formed such that its outline roughly agrees with a bottom surface outline of a first electrode 26a. A bottom surface of a first electrode 26a is adhered to a top surface of the film-like portion 23a of the relaying element 23 via a conductive adhesive film 27. Thus, the first electrode 26a and the relaying element 23 are electrically coupled. As shown in FIG. 10, a recess is formed in a portion of the top surface of the second metal component 21b' corresponding to the downward protuberance 21b3, and the first electrode 26a of the electric storage element 26 slightly penetrates the recess.

The second metal component 21b' is fabricated by deforming, through press working, a metal plate carrying an insulating layer 22c, the relaying element 23, a first terminal 24, and a second terminal 25 formed thereon. The insulating layer 22c, the relaying element 23, a first terminal 24, and a second terminal 25 may be formed on a metal plate after press working.

In the electrochemical device 20-1, the second metal component 21b' has a downward protuberance 21b3, thereby improving a mechanical strength of the second metal component 21b' compared to the second metal component 21b of the electrochemical device 20, and thereby improving a mechanical strength of the container 21.

The first electrode 26a of the electric storage element 26 slightly penetrates a recess in a top surface of the second metal component 21b', thereby enabling a precise positioning of the first electrode 26a with respect to the second metal component 11b' and preventing the displacement of the first electrode 26a after the adhesion.

Figure 11:
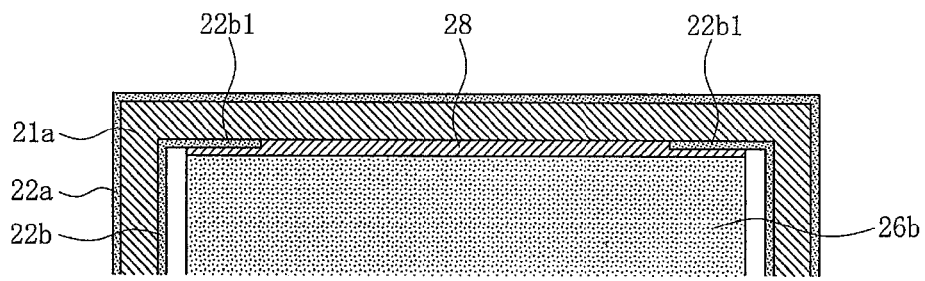
FIG. 11 shows a partial expanded sectional view of an electrochemical device according to another embodiment of the invention.

FIG. 11 shows a partial expanded sectional view of an electrochemical device according to another embodiment of the invention. As shown in FIG. 11, in an electrochemical device according to the embodiment, an insulating layer 22b1 is disposed on an inner top surface of the first metal component 21a. The insulating layer 22b1 is disposed to cover a portion of the inner top surface of the first metal component 21a open to the electrolyte, and to continue with the insulating layer 22b of the first metal component 21a.

According to the embodiment, the insulating layer prevents the second metal component 21a from contacting directly with an electrolyte, thereby preventing the second metal component 21a from being corroded.

Figure 12:
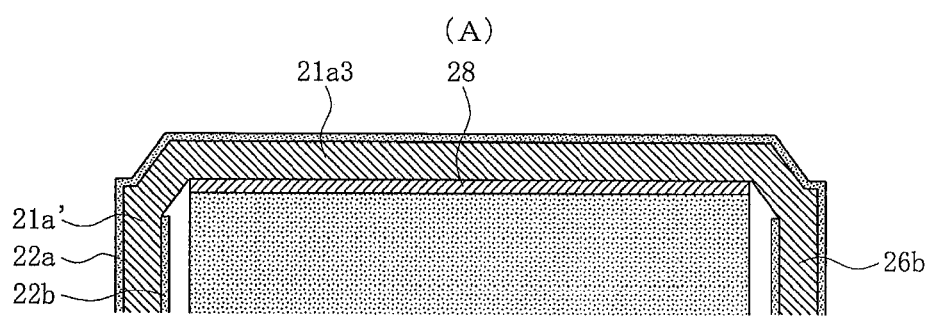
FIGS. 12(A) and 12(B) show partial expanded sectional views of an electrochemical device according to another embodiment of the invention.

FIGS. 12(A) and 12(B) show a partial expanded sectional view of an electrochemical device according to other embodiment of the invention. In an embodiment as shown in FIG. 12(A), an upward protuberance 21a3 is disposed on the first metal component 21a' of a container 21. In an embodiment as shown in FIG. 12(B), a downward protuberance 21a3 is disposed on the first metal component 21a" of a container 21.

According to the embodiments, a mechanical strength of the second metal component 21a' and 21a" is improved compared to that of the first metal component 21a, thereby improving a mechanical strength of the container 21.

Figure 13:
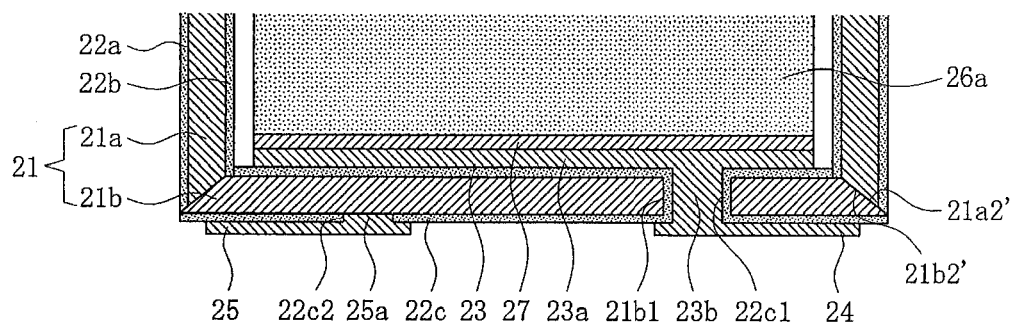
FIG. 13 shows a partial expanded sectional view of an electrochemical device according to another embodiment of the invention.

FIG. 13 shows a partial expanded sectional view of an electrochemical device according to another embodiment of the invention. In the embodiment, as shown in FIG. 13, an outer periphery of a bottom surface 21a2' of a first metal component 21a is sloped at a predefined angle. Also, an outer periphery of a top surface 21b2' of a second metal component 21b is sloped at a roughly same angle as the outer periphery of the bottom surface 21a2'. In a further embodiment, the outer periphery of the bottom surface 21a2' and the outer periphery of the top surface 21b2' may be configured as a brim sloped at a predefined angle, as shown in FIG. 7(B).

According to the embodiments, a contact area is increased between an outer periphery of a bottom surface 21a2' of a first metal component 21a and an outer periphery of a top surface 21b2' of a second metal component 21b. Also, a precise positioning between the first metal component 21a and the second metal component 21b is possible.

Thus, the invention was explained based on the embodiments deemed to be the most practical at the moment, but these explanations are not intended to limit the scope of the invention. The invention is not limited to the aforementioned embodiments, and various changes or modifications may be made to the extent not to depart from the aim of the invention.

Possible modifications may include the following. The top surface outlines of film-like portions 13a and 23a may be smaller than the bottom surface outlines of first electrodes 16a and 26a. Also, the film-like portions 13a and 23a may be configured in different shapes than the bottom surface outlines of the first electrodes 16a and 26a, for example, in a rough ellipse or circle. Second terminal connections 12b and 22c2 may be fabricated in various sizes. For example, the second terminal connections 12b and 22c2 may be fabricated larger than the connections shown in the figure such that the entire surface of a second terminal 15 (or a second terminal 25) facing a first metal component 11a (or a second metal container 21b or 21b') is tightly adhered to the first metal component 11a (or a second metal container 21b or 21b').

Also, the containers 11 and 21 may be configured in various shapes. The containers 11 and 21 may be, for example, in a rough cylindrical or elliptic cylindrical shape.

Industrial Application

The invention relates to an electrochemical device having a structure wherein a container encloses a rechargeable electric storage element and electrolyte.

List of Reference Numbers 10, 10-1, and 10-2: electrochemical device
11: container
11a: first metal component
11a1: recess
11a2: through hole
11a3: outer periphery of top surface
11b, 11b', and 11b": second metal component
11b1: outer periphery of bottom surface
11b2: upward protuberance
11b3: downward protuberance
12: insulating layer
13: relaying element
13a: film-like portion
13b: column
14: first terminal
15: second terminal
16: electric storage element
16a: first electrode 16b: second electrode
16c: separator
20 and 20-1: electrochemical device
21: container
21a: first metal component
21a1: recess
21a2: outer periphery of bottom surface
21b and 21b': second metal component
21b1: through hole
21b2: outer periphery of top surface
21b3: downward protuberance
22a, 22b, and 22c: insulating layer
23: relaying element
23a: film-like portion
23b: column
24: first terminal
25: second terminal
26: electric storage element
26a: first electrode
26b: second electrode
26c: separator

What is claimed is:

1. A surface mounting electrochemical device comprising:
a container comprising:
a first metal component having a recess; and
a second metal component welded to the first metal component to close an opening of the recess of the first metal component;
a rechargeable electric storage element and electrolyte enclosed in the container; and
a first terminal and a second terminal having opposite polarities disposed on a bottom surface for serving as a mounting surface,
wherein the electric storage element has a first electrode electrically insulated from the container, and a second electrode electrically conducting with the container,
and wherein the first terminal is electrically insulated from the container and electrically conducts with the first electrode of the electric storage element via a relaying element disposed on the container so as to be electrically insulated from the container,
and wherein the second terminal electrically conducts with the container and electrically conducts with the second electrode of the electric storage element via the container.

2. The electrochemical device according to claim 1, wherein an insulating layer formed on a predefined area of the container electrically insulates the first electrode of the electric storage element from the container and electrically insulates the relaying element from the container.

3. The electrochemical device according to claim 2, wherein the first metal component has an opening of the recess on a top side thereof, and wherein an outer periphery of a bottom surface of the second metal component is welded to an outer periphery of a top surface of the first metal component.

4. The electrochemical device according to claim 2, wherein the first metal component has an opening of the recess on a bottom side thereof, and wherein an outer periphery of a top surface of the second metal component is welded to an outer periphery of a bottom surface of the first metal component.

5. The electrochemical device according to claim 1, wherein the first metal component has an opening of the recess on a top side thereof, and wherein an outer periphery of a bottom surface of the second metal component is welded to an outer periphery of a top surface of the first metal component.

6. The electrochemical device according to claim 5, wherein the second metal component is tabular.

7. The electrochemical device according to claim 5, wherein the second metal component has an upward protuberance within the outer periphery of the bottom surface of the second metal component.

8. The electrochemical device according to claim 5, wherein the second metal component has a downward protuberance within the outer periphery of the bottom surface of the second metal component.

9. The electrochemical device according to claim 1, wherein the first metal component has an opening of the recess on a bottom side thereof, and wherein an outer periphery of a top surface of the second metal component is welded to an outer periphery of a bottom surface of the first metal component.

10. The electrochemical device according to claim 9, wherein the second metal component is tabular.

11. The electrochemical device according to claim 9, wherein the second metal component has a downward protuberance within the outer periphery of the top surface of the second metal component.

* * * * *